United States Patent
Hawkes et al.

(10) Patent No.: US 9,421,602 B2
(45) Date of Patent: Aug. 23, 2016

(54) MACHINE FOR DEEP ROLLING TOOL POSITIONING

(71) Applicant: UNITED TECHNOLOGIES CORPORATION, Farmington, CT (US)

(72) Inventors: Justin R. Hawkes, Marlborough, CT (US); Andrzei E. Kuczek, Bristol, CT (US); Raja Kountanya, Vernon, CT (US); Daryl J. Michaud, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/567,555

(22) Filed: Dec. 11, 2014

(65) Prior Publication Data

US 2015/0165513 A1    Jun. 18, 2015

Related U.S. Application Data

(60) Provisional application No. 61/917,518, filed on Dec. 18, 2013.

(51) Int. Cl.
  *B21H 7/16* (2006.01)
  *B21B 27/02* (2006.01)
  *B21B 31/16* (2006.01)
  *B21B 31/02* (2006.01)

(52) U.S. Cl.
  CPC .............. *B21H 7/16* (2013.01); *B21B 27/021* (2013.01); *B21B 31/16* (2013.01); *B21B 31/02* (2013.01)

(58) Field of Classification Search
  CPC ..... B21B 27/02; B21B 27/021; B21B 31/14; B21B 31/16; B21H 7/16
  USPC ............ 72/107, 110, 210, 252.5, 214, 207; 29/90.3
  See application file for complete search history.

(56) References Cited

U.S. PATENT DOCUMENTS

| 3,983,734 | A | * | 10/1976 | Walig .................. B21J 5/10 72/214 |
|---|---|---|---|---|
| 5,666,841 | A | | 9/1997 | Seeger et al. |
| 5,784,912 | A | | 7/1998 | Focken et al. |

(Continued)

FOREIGN PATENT DOCUMENTS

DE    102004039940 A1    2/2006

OTHER PUBLICATIONS

U.S. Non Final Office Action for U.S. Appl. No. 14/567,562 mailed Jul. 30, 2015, 14 pages.

(Continued)

*Primary Examiner* — Shelley Self
*Assistant Examiner* — Pradeep C Battula
(74) *Attorney, Agent, or Firm* — Cantor Colburn LLP

(57) ABSTRACT

A device and methods are provided for deep rolling. In one embodiment, a machine includes a deep rolling tool having a plurality of rolling elements, wherein each rolling element is mounted at the distal end of a fork arm, and wherein the rolling elements are configured to apply a compressive stress to articles received by the deep rolling tool. The machine may also include a positioning element coupled to the deep rolling tool, wherein the positioning element is configured to position the deep rolling tool and apply the deep rolling tool to an article.

20 Claims, 7 Drawing Sheets

(56) References Cited

U.S. PATENT DOCUMENTS

| | | | |
|---|---|---|---|
| 6,125,677 A * | 10/2000 | Yasuoka | H01M 2/0202 72/110 |
| 6,581,430 B2 * | 6/2003 | Wilson | 72/254 |
| 6,792,781 B1 | 9/2004 | Bindernagel | |
| 7,237,417 B2 * | 7/2007 | Wittig | B21H 8/00 72/214 |
| 7,506,444 B2 | 3/2009 | Weise | |
| 7,600,404 B2 * | 10/2009 | Prevey, III | 72/75 |
| 7,805,972 B2 | 10/2010 | Prevey, III | |
| 7,998,168 B2 | 8/2011 | Kleimann, Sr. | |
| 8,051,565 B2 | 11/2011 | Luna et al. | |
| 8,356,506 B2 | 1/2013 | Szuba | |
| 2002/0033037 A1 | 3/2002 | Grimmel | |
| 2004/0267305 A1 | 12/2004 | Borgman | |
| 2005/0107230 A1 | 5/2005 | Ostertag et al. | |
| 2012/0216590 A1 * | 8/2012 | Szuba | 72/370.19 |
| 2013/0167609 A1 | 7/2013 | Heimann | |
| 2013/0186161 A1 * | 7/2013 | El-Wardany | B23P 9/02 72/252.5 |
| 2013/0219982 A1 | 8/2013 | Feldmann et al. | |
| 2014/0326032 A1 | 11/2014 | Steffens et al. | |

OTHER PUBLICATIONS

U.S. Non Final Office Action for U.S. Appl. No. 14/567,575 mailed Jul. 30, 2015, 14 pages.
Final Office Action dated Feb. 19, 2016 for U.S. Appl. No. 14/567,562.
Final Office Action dated Feb. 22, 2016 for U.S. Appl. No. 14/567,575.
Non-Final Office Action dated Jan. 13, 2016 for U.S. Appl. No. 14/567,522.
English Translation to Abstract for DE102004039940.

* cited by examiner

MACHINE FOR DEEP ROLLING TOOL POSITIONING

CROSS-REFERENCE TO RELATED APPLICATIONS

This application claims priority to U.S. Provisional Application No. 61/917,518 filed on Dec. 18, 2013 and titled Machine for Deep Rolling Tool Positioning, the disclosure of which is hereby incorporated by reference in its entirety.

FIELD

The present disclosure relates generally to machinery, and more particularly to deep rolling tools and methods for enhancing fatigue life.

BACKGROUND

Peening, burnishing, and deep rolling are techniques that are used to induce stress at the surface of a component. Conventional methods may employ some form of caliper to simultaneously pinch opposing sides of a component. These tools, typically referred to as ball point tools, often use a caliper with ball bearings to pinch the component. FIG. 1 illustrates a graphical representation of a conventional hydraulic tool 100 which uses a pressurized hydraulic fluid to provide a clamping force. Hydraulic tool 100 is a rigid body tool including hydraulic clamping elements 105 and 110 which are hydraulically actuated. Hydraulic tool 100 is supplied with a pressurized fluid by hydraulic input valve 115. The main problem with hydraulic tools is that they are bulky which makes it difficult to process components. In addition, the use of hydraulic ball bearing clamping elements 105 and 110 have a small contact zone which requires a lot of passes in order to process a surface, and thus, conventional hydraulic tools are slow. Further, these tools require a high pressure pump which adds to complexity and cost.

A drawback of conventional machining operations of peening/burnishing/deep rolling is that they are typically slow and expensive to perform. Another drawback is that conventional tools are non-adjustable and may not be usable with certain component geometries/thicknesses.

Thus, there is a need for a machine and tool for applying stress to objects.

BRIEF SUMMARY OF THE EMBODIMENTS

Disclosed and claimed herein are a device and methods for deep rolling. In one embodiment, a deep rolling tool for applying compressive stress with rolling elements includes a fork having a base section and a plurality of fork arms, wherein each fork arm extends outwardly from the base section and wherein the fork arms are separated from one another to form an opening, and a plurality of rolling elements, wherein each rolling element is mounted at the distal end of a fork arm, and wherein the rolling elements are configured to apply a compressive stress to articles received by the deep rolling tool.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

One aspect of the disclosure relates to a device and methods for deep rolling to improve fatigue life in objects. According to one embodiment, a deep rolling tool is provided including crowned rollers to provide a localized zone of compressive stress at the surface of a component. According to another embodiment, the deep rolling tool may be configured to provide compressive stress to bladed elements, such as a turbine blade, compressor blade, fan blade, bladed disk, object with multiple blades, etc.

According to another embodiment, a machining device is provided including a deep rolling tool. The machining device maybe a milling machine or other device for processing bladed elements, such as turbine blades, compressor blades, fan blades, etc. According to one embodiment, the machining device may be a 5 axis milling machine.

In another embodiment, a deep rolling tool is provided with rollers having eccentric bushings to allow for increased compressive stress. The eccentric bushings can allow for alteration of shaft center line spacing.

According to another aspect of the disclosure, processes for using a deep rolling tool are discussed below. In one embodiment, a deep rolling tool may be positioned and applied to an article or component. The deep rolling tool may be repositioned and applied to another portions of an article, or to another article. For example, the deep rolling tool may be applied to a bladed element, such as a particular blade of the bladed element, and then repositioned to another blade of the bladed element.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 1:
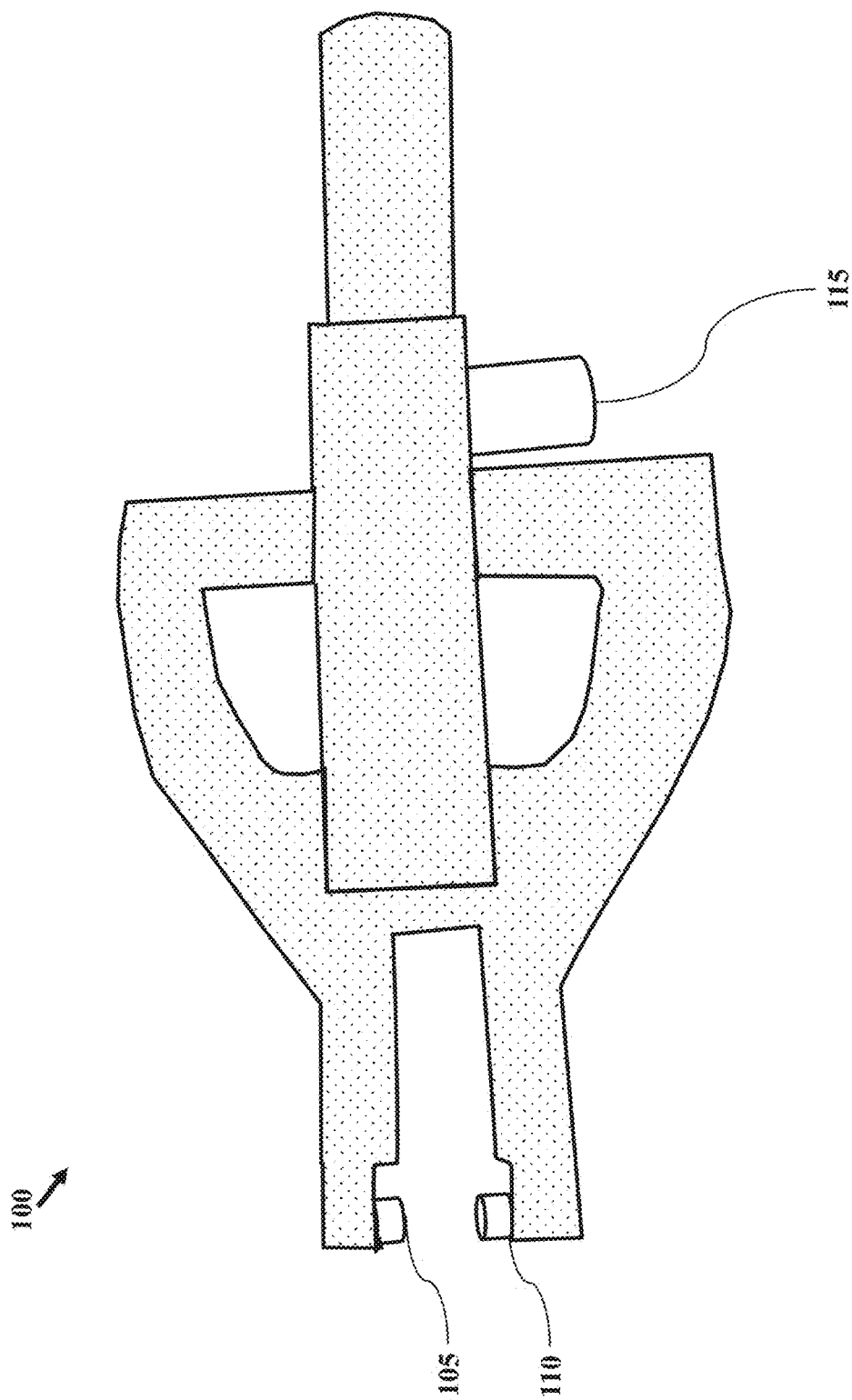
FIG. 1 depicts a conventional hydraulic tool.
Figure 2A:
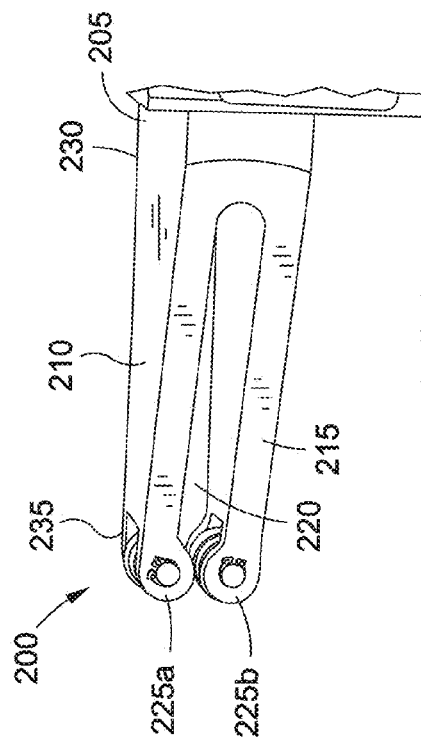
FIGS. 2A-2B depict a deep rolling tool according to one or more embodiments.
Figure 2C:
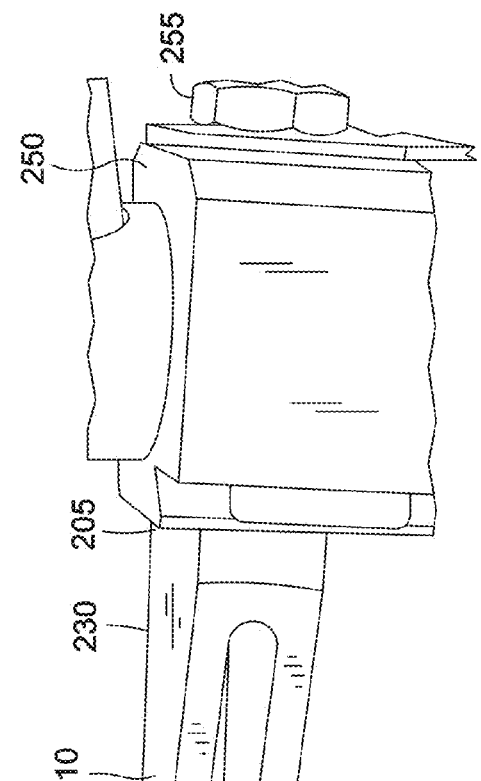
FIG. 2C depicts a deep rolling tool and tool holder according to one or more embodiments.
Figure 2B:
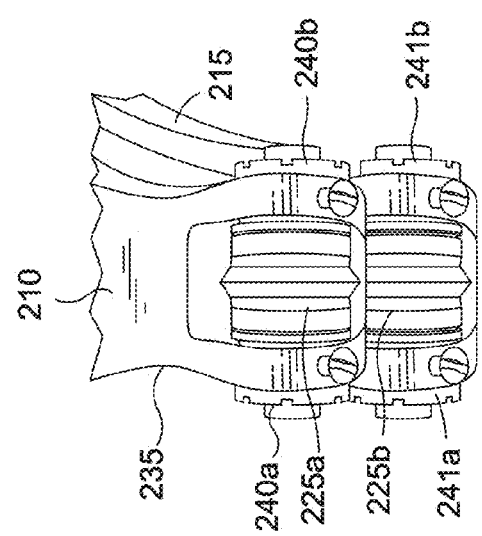

Referring now to the figures, FIGS. 2A-2B depict a deep rolling tool according to one or more embodiments. Deep rolling tool 200 may be configured to apply compressive stress with rolling elements. As shown in FIG. 2A, deep rolling tool 200 includes a fork 205 with fork arms 210 and 215. Fork arms 210 and 215 extend outwardly from base section 230 and the fork arms are separated from one another to form opening 220. Fork 205 may be a flexible fork tool configured to provide a compressive force based on the flexural stiffness of the plurality of fork arms 210 and 215. The force is applied by expanding fork arms 210 and 215. The force can be tailored to increase non-linearly with expansion. According to one embodiment, deep rolling tool 200 includes a plurality of rolling elements, 225a-225b mounted at the distal end 235 of a fork arm. Rolling elements 225a-225b are configured to apply a compressive stress to articles received by the deep rolling tool.

According to one embodiment, fork arms 210 and 215 of deep rolling tool 200 are flexible, and therefore lack any pivot. When deep rolling a bladed element, the configuration of deep rolling tool 200 is not constrained by the depth from the blade edges to which compressive residual stresses are imparted, and is not constrained by the blade spacing. In addition, material of the bladed element is pushed to the center of the blade by deep rolling tool 200 to form continuous zones of compressive residual stress along the edges of rolling elements. Deep rolling tool 200 may have redundant degrees of freedom which can be adjusted for dimensional variations in new or repaired blades.

FIG. 2B depicts a frontal view of deep rolling tool 200 including fork arms 210 and 215. Rolling elements 225a-225b may be mounted to fork arms 210 and 215. According to one embodiment, each rolling element includes bushings, shown as 240a-240b for rolling element 225a and 241a-241b for rolling element 225b.

According to one embodiment, deep rolling tool 200 does not require a socket to receive a burnishing element. Burnishing is a surface finish enhancement process, while deep rolling tool 200 provides sub-surface integrity enhancement processing.

According to one embodiment, deep rolling tool 200 does not require an actuator, rather force control may be obtained by the non-linear stiffness of the fork arms 210 and 215 (e.g., stiffness with respect to the deflection of the fork arms). Unlike control of a hydraulic element, deep rolling tool 200 may not require precise force control. For example, deep rolling tool 200 can apply a higher force to thicker sections of an element due to the greater deflection of the fork arms. Fork arms 210 and 215 of deep rolling tool 200 may be configured to provide a depth of subsurface deformation and percentage of cold work based on two-dimensional prototyping of objects to be rolled.

Deep rolling tool 200 can avoid damage to neighboring regions of a single blade or adjacent blade since rollers and fork arms may enter the blades in a chord-wise direction. Deep rolling tool 200 may be characterized as having an unbiased tool path configuration to ensure that peening forces do not exert a local twisting moment to blade surfaces.

According to one embodiment, rolling elements 225a-225b are each crowned rollers to provide a compressive force based at least on the flexural stiffness of fork arms 210 and 215.

Referring now to FIG. 2C, a deep rolling tool and tool holder are depicted according to one or more embodiments. Deep rolling tool 200 is depicted in FIG. 2C mounted to tool holder block 250. In certain embodiments, tool holder block 250 may hold deep rolling tool 200 in a fixed position. In other embodiments, tool holder block 250 may be configured to position deep rolling tool 200. Tool holder block 250 may be configured to rotate fork 205 via rotary spine 255 in certain embodiments. Rotary spine 255 may allow for rotation of the deep rolling tool during repositioning, and in some cases during deep rolling.

According to one embodiment, deep rolling tool 200 is configured to apply residual stress to at least one of a turbine blade, compressor blade, fan blade, bladed disk, bladed element and metal object in general. The compressive stress can improves fatigue life of the article, such as a bladed object. Rolling elements 225a-225b apply a residual stress which inhibits crack propagation in an article.

In one embodiment, deep rolling tool 200 may be configured to apply a compressive stress to improve at least one of fatigue life of the article, surface finish of the article and aerodynamic performance (e.g., improved compressor efficiency) of the article. With respect to surface finish, the compressive stress and/or rolling by deep rolling tool 200 may improve received articles to allow for a surface finish that is suitable for airfoil applications and combustion engine components such as turbine blades, compressor blades, fan blades, etc. In certain embodiments, deep rolling tool 200 may improve surface finish to allow for a roughness average of 0.5 µm to 10 µm. By improving the surface finish, deep rolling tool 200 may heal surface defects, which also can improve fatigue performance.

Figure 3:
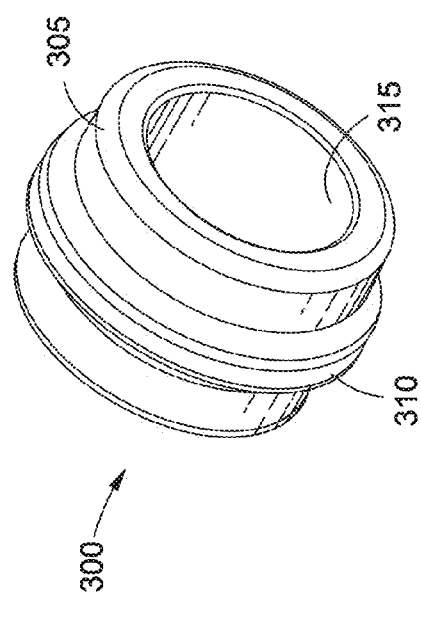
FIG. 3 depicts a rolling element according to one or more embodiments.

FIG. 3 depicts a rolling element according to one or more embodiments. According to one embodiment, crowned roller 300 includes minor radius 310 for contacting articles received by the rolling tool, and a major diameter 305 for providing a load capacity. Crowned roller 300 includes a hollow center portion 315 for coupling to a bushing, and shaft for coupling to a fork arm.

In one embodiment, each rolling element, such as crowned roller 300, is secured to a fork arm with roller bushings. Each rolling element includes a center axis and rotates about its center axis, and wherein the center axis of a rolling element is parallel to the central axis of another rolling element. According to another embodiment, a minimum gap may be provided in between rollers to allow for fork arms to expand. The gap spacing may be based on tip clearance of a bladed element and crowned roller 300 may by sized to allow for rolling of bladed element tips and converging sections.

Figure 4:
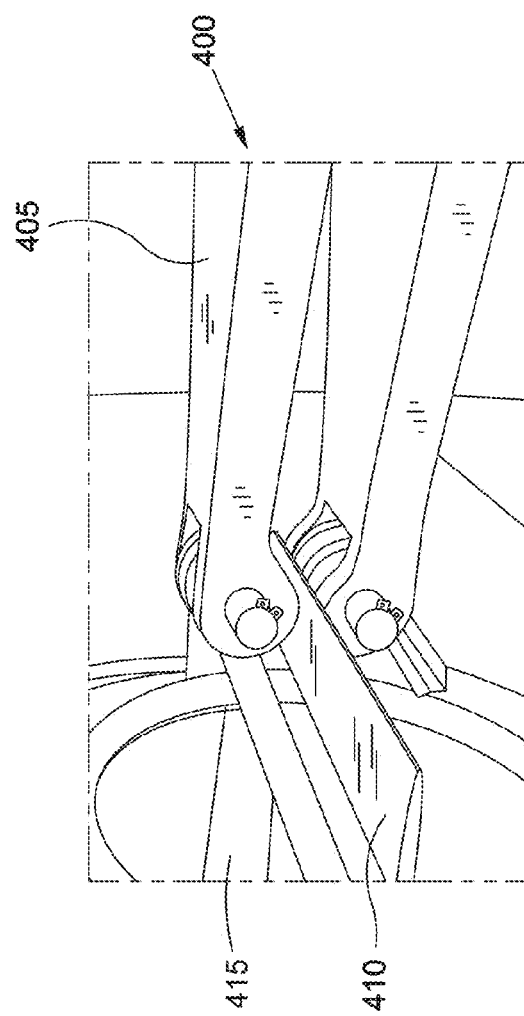
FIG. 4 depicts a graphical representation of deep rolling on a component according to one or more embodiments.

FIG. 4 depicts a graphical representation of deep rolling on a component according to one or more embodiments. Deep rolling tool 400 (e.g., deep rolling tool 200) is shown rolling with fork 405 and blade 410. A deep rolling tool according to one or more embodiments is designed to function similarly to commercial hydraulic tools but with simpler, more compact operation and to produce a larger contact zone, thus reducing processing time. According to one embodiment, by using crowned rollers as opposed to ball bearings, it is readily possible to tailor the size of the contact zone by adjusting the minor (crown) radius and including a flat of desired width. The major (roller) diameter can be made sufficiently large to enable the use of a compact roller bearing that has sufficient load carrying capacity negating the need for a hydraulic system. According to preliminary fatigue testing, greater than 10× improvement in fatigue life may be achieved, as will be discussed with reference to FIG. 5 below.

According to one embodiment, deep rolling tool 400 may be configured to peen blade edges in the chord-wise direction, and peen blade tips. Rollers of deep rolling tool 400 may require a threshold gap before they open and exert opposing forces. In certain embodiments, the threshold gap can be altered allow for the tool to enter the blade tip in a span-wise direction.

Figure 5:
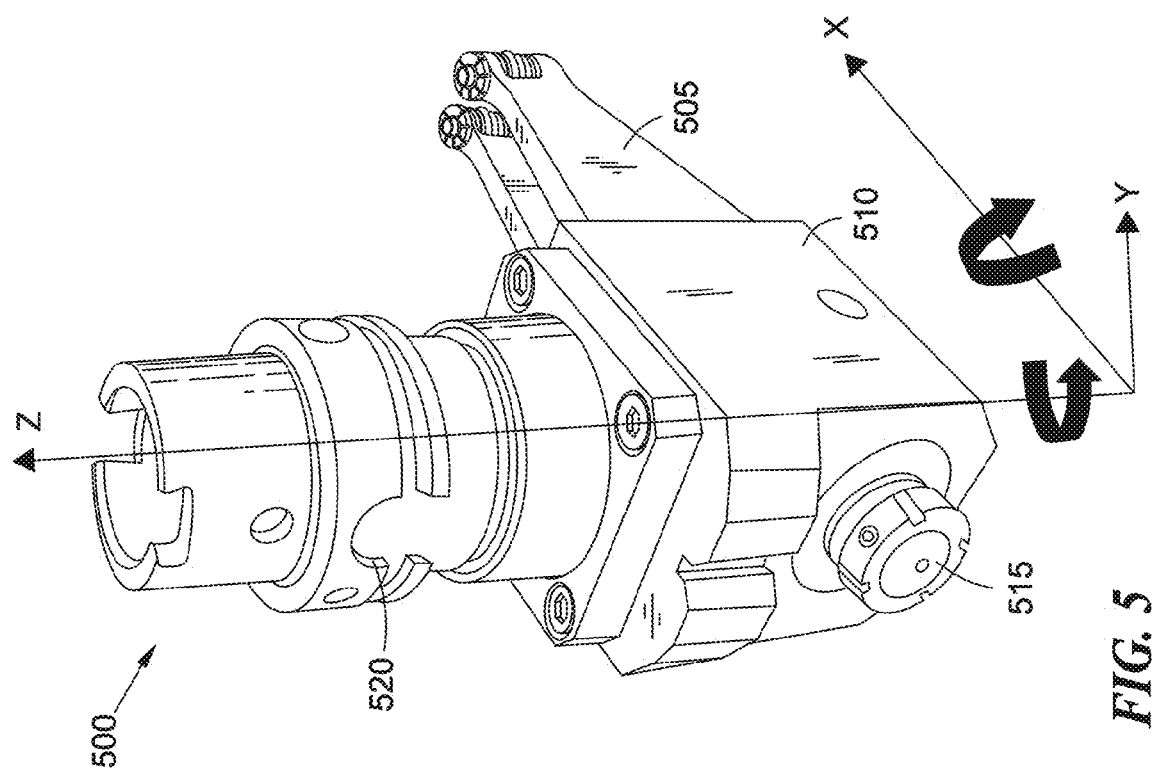
FIG. 5 depicts a deep rolling tool according to one or more embodiments.
Figure 6:
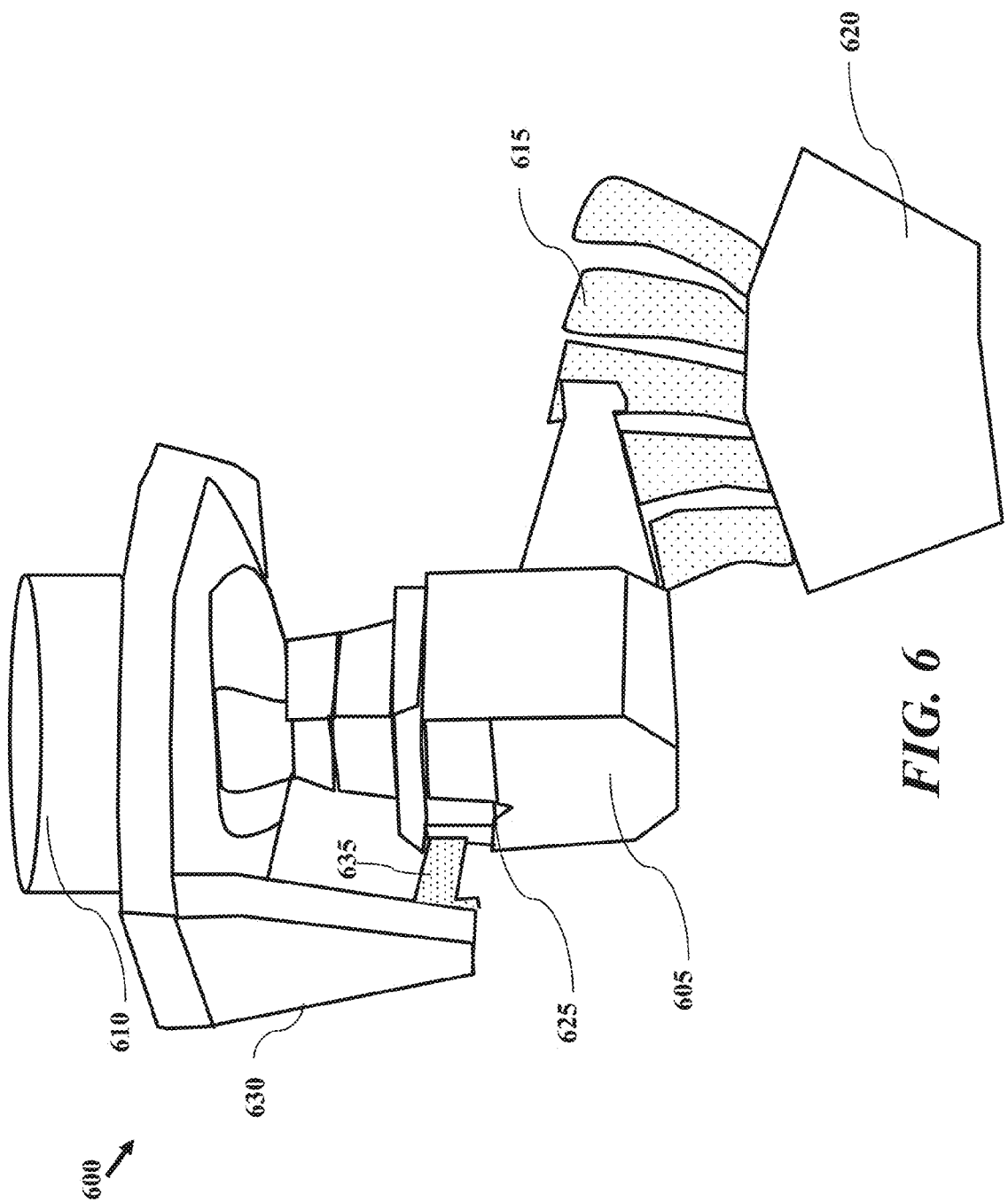
FIG. 6 depicts a machine including a deep rolling tool according to one or more embodiments.

In FIG. 4, bladed element 410 is mounted to machine 415. When deep rolling tool 400 is pressed on to the edge of blade 410, the fork arms of deep rolling tool 400 are forced apart which produces a reaction force that is proportional to the amount of deflection. The roller and fork geometry are configured to provide a sufficiently large contact stress to locally yield the blade material generating a residual compressive stress field. According to one embodiment, the residual stress generated by deep rolling tool 400 inhibits crack propagation from the blade edge FIG. 5 depicts a deep rolling tool according to one or more embodiments. According to one embodiment, a deep rolling tool may be positioned by a machine including a positioning element. In FIG. 5, deep rolling tool 505 is mounted to tool holder base 510 and positioning element 520. Positioning element 520 may be coupled to a machine, such as a milling machines to position deep rolling tool as shown be the reference directions and to rotate the tool as shown by the reference arrows in FIG. 5. By way of example, deep rolling tool 500 may be rotated about the x axis in FIG. 5 based on rotary coupling 515. Positioning element 520 may be configured for rotation about the z-axis as shown in FIG. 6. Deep rolling tool 500 may be incorporated into a machine, such as a 5 axis milling machine in certain embodiments.

According to one embodiment, a machine, such as a milling machine includes deep rolling tool 500 having a plurality of rolling elements, wherein each rolling element is mounted at the distal end of a fork arm, the rolling elements are configured to apply a compressive stress to articles received by the deep rolling tool, and a positioning element coupled to the deep rolling tool, wherein the positioning element is configured to position the deep rolling tool and apply the deep rolling tool to an article. In certain embodiments, the machine is a 5-axis machine and the positioning element is configured to position the deep rolling tool in three dimensions, and rotate the tool in two dimensions. In one embodiment, a block of the deep rolling tool is mounted to the positioning element, and a fork is perpendicular to the positioning element. The deep rolling tool may be rotated along a central axis of the rolling tool by the positioning element. The positioning element may be configured to move the rolling tool in an alternating motion from a retracted position to an extended position, such as a linear path. Deep rolling tool 500 may be configured to apply residual stress to at least one of a turbine blade, compressor blade, fan blade, bladed disk, bladed element and metal object in general.

According to another embodiment, a machine, such as a milling machine includes deep rolling tool 500 having a plurality of rolling elements and a positioning element coupled to the deep rolling tool, wherein the positioning element is configured to position and apply the deep rolling tool to a bladed element. The positioning element of the machine may be configured to move the rolling tool in an alternating motion from a retracted position to an extended position, and/or in a linear path.

FIG. 6 depicts a machine including a deep rolling tool according to one or more embodiments. As shown in FIG. 6, machine 600 is configured to position tool holder 605 (which includes a deep rolling tool described herein) and positioning element 610. Machine 600 may be configured to position a deep rolling tool for a bladed element, shown as 615 in FIG. 6. Bladed elements may be individual or coupled to a support, such as 620, according to one or more embodiments. Machine 600 may be configured to position and operate tool 605 based on one or more of a two-dimensional model and three-dimensional model of an element, such as a bladed element or collection of bladed elements.

According to one embodiment, machine 600 and/or tool holder 605 may include one or more elements to balance degrees of freedom. By way of example, the block of tool holder 605 may have an additional degree of freedom to rotate against a spring element (e.g., spring element). The spring element and a thrust bearing within tool holder 605 may allow for the deep rolling tool to rotate and return to a home position. In certain embodiments, machine 600 and/or tool holder 605 may include one or more elements restrain motion of a deep rolling tool during operation. As shown in FIG. 6, tool holder 605 includes y-notch 625. In addition, flange 630 which holds plunger 635 configured to engage y-notch 625. In a home position, plunger 635 rests in the center notch of y-notch 625. During operation, rotation stress on the tool and tool holder 605 may be counteracted by plunger 635 as the plunger contacts raised portions of y-notch 625. Plunger 635 may provide a restraining moment (e.g., force) to tool holder 605.

According to one embodiment, machine 600 may be a 5 axis milling machine to enable in-situ processing of bladed elements (e.g., integrated bladed rotors). As shown in FIG. 6, the fork of a deep rolling tool is mounted in a block that allows rotation about the machines spindle axis and about the fork's axis that is at 90 degrees to the spindle axis. These two additional degrees of freedom enable the tool to process a blade with complex curvature without imparting any significant bending loads on the blade. The bearings in the tool holder block on the spindle axis enable the milling machine to be run with its spindle rotating without the deep rolling tool spinning. This is done as machines often require the spindle to be turning in order to run a program and it also much less likely to cause any problems to the spindle bearings. The tool may include spring loaded centering mechanisms on both of the tool holder's axes so that the tool will return to its home position when not in use but will not induce any significant forces on the blade. According to one embodiment, simplicity and compactness, and by extension, low cost are the principle benefits vs. competing designs.

The deep rolling tool of one or more embodiments described herein can be readily adapted for use with standard tool holders. For example, such a tool is compact to allow for fit in between neighboring blades while processing a blade near its root. In one embodiment, a machine 600 may be a 5 axis milling machine that would typically be used for machining an integrally blade rotor (IBR). The deep rolling tool may be simple, compact and capable of processing the leading and trailing edges of IBRs, while still installed in the machine.

Figure 7:
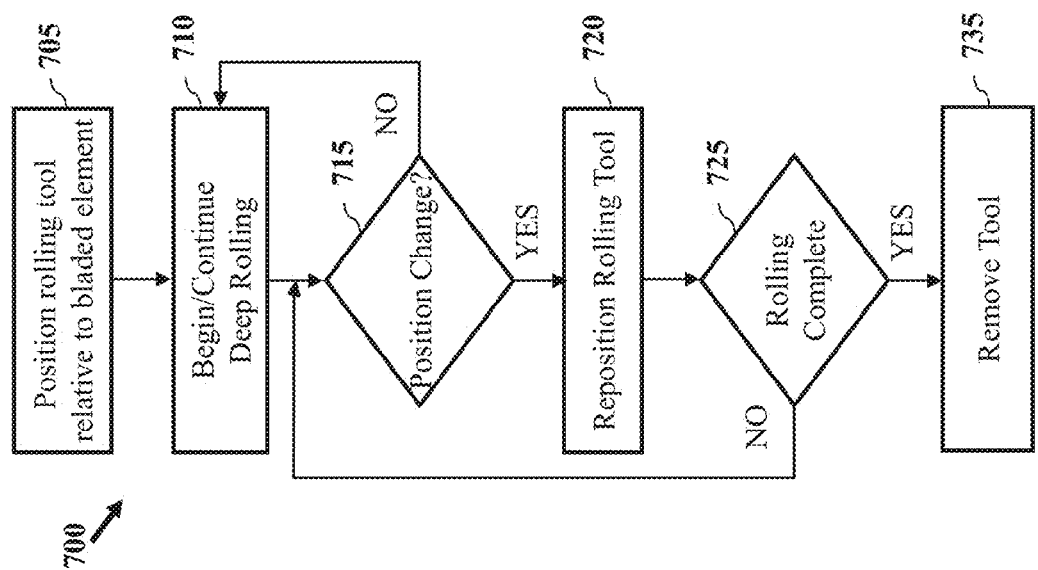
FIG. 7 depicts a process for a deep rolling tool according to one or more embodiments.

FIG. 7 depicts a process for a deep rolling tool according to one or more embodiments. Process 700 may be initiated by positioning a rolling tool relative to a bladed element at block 705. For example, the deep rolling tool may be applied to a bladed element. At block 710, rolling may be initiated or continued in some circumstances. A milling machine may be configured to execute process 700 and may be configured to determine when a position change for the deep rolling tool is required. When a position change is not required (e.g., "NO" path out of decision block 715), the milling machine continues to deep roll at block 710. When a position change is required (e.g., "YES" path out of decision block 715), the milling machine repositions the rolling tool at block 710.

Process 700 may continue with the machine determined if rolling is complete a decision block 725. When rolling is not complete (e.g., "NO" path out of decision block 725), the milling machine continues to deep roll at block 710. When rolling is complete (e.g., "YES" path out of decision block 725), the milling machine removes the rolling tool at block 735.

Figure 8:
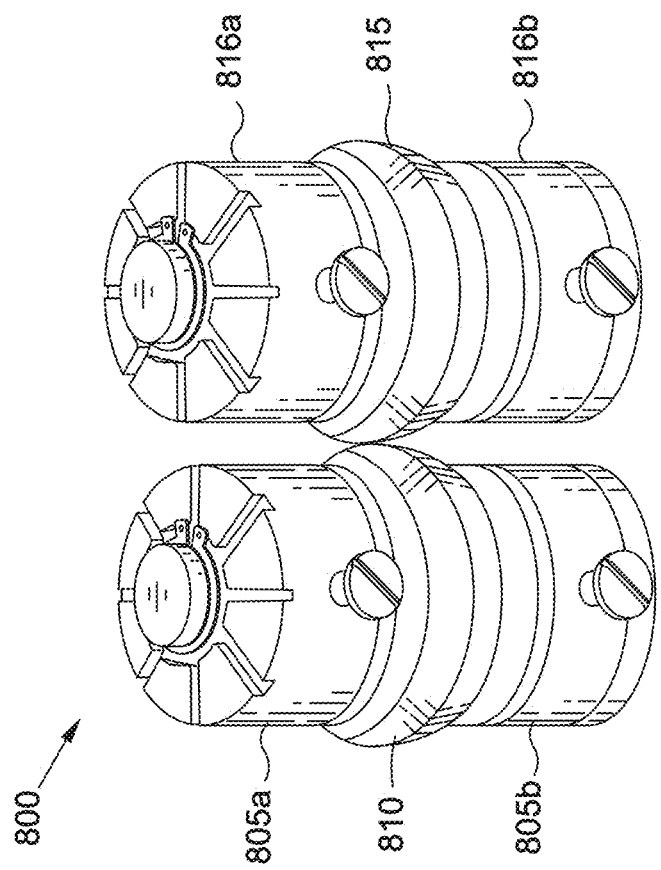
FIG. 8 depicts a elements of a deep rolling tool according to one or more embodiments.

Referring now to FIG. 8, elements of a deep rolling tool are depicted according to one or more embodiments. According to one embodiment, rolling elements 800 of a deep rolling tool include eccentric roller bushings. FIG. 8 depicts a pair of roller elements 800 wherein each rolling elements includes a crowned roller, shown as 810 and 815, and each rolling element includes bushings, shown as 805a-b and 816a-b. According to one embodiment, bushings 805a-b and 816a-b may be configured to alter the center line spacing of the rolling elements. In addition, the compressive force applied by a deep rolling tool may be increased based on the position of eccentric bushings, such that a fork of a deep rolling tool provides a compressive force based, at least in part, on the flexural stiffness of the plurality of fork arms and the position of the eccentric roller bushings.

Figure 9:
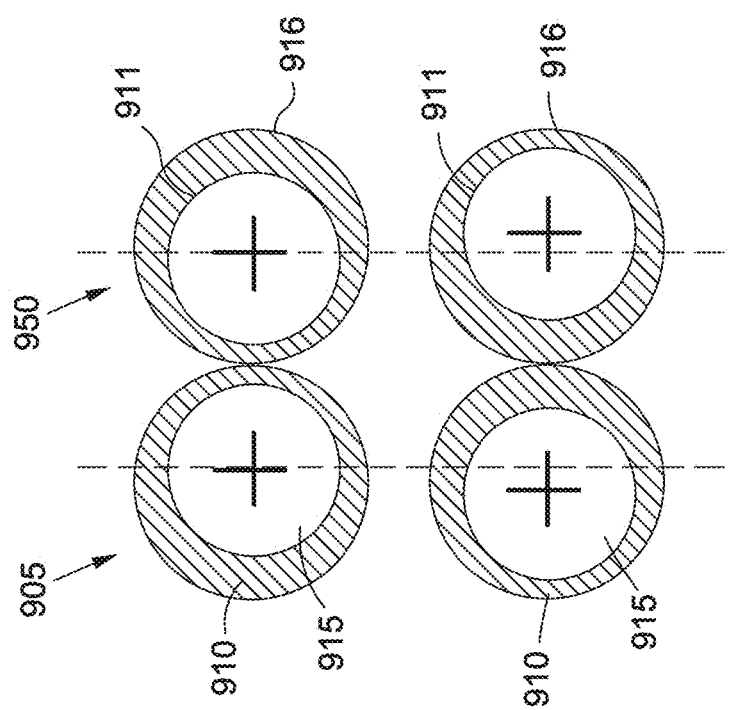
FIG. 9 depicts a graphical representation of bushing spacing according to one or more embodiments.

FIG. 9 depicts a graphical representation of bushing spacing according to one or more embodiments. According to one embodiment, rolling elements of a deep rolling tool may include eccentric bushings such that rotation of the bushing element adjusts shaft center line spacing. FIG. 9 depicts the shaft center line spacing at two positions where the maximum and minimum contact stress are applied. The addition of eccentric bushings between the fork and the roller shafts of the deep rolling tool enables the distance between the shaft center lines to be adjusted.

Position 905, for bushings 910 and 911 of rolling elements 915 and 916, relates to a first position, wherein the rolling elements 915 and 916 provide less contract stress. Position 950, for bushings 915 and 916 of rolling elements 910 and 911, relates to a second position, wherein the rolling elements 910 and 911.

According to one embodiment, a deep rolling tool includes interchangeable rollers having varying geometries that affect the contact stress when processing a part. While having a fixed flexural stiffness fork with various roller geometries may be applicable to a range of typical blades, the ability to adjust the applied force will broaden its range.

According to one embodiment, bushings 910 and 911 may each be set with a mirror position relative to one-another. With this modification the rollers can be adjusted so that there is a gap between them at one end of the adjustment range through to being pre-loaded at the other end of the range. While this configuration doesn't alter the stiffness of the fork arm, it does affect the applied pinch force. In certain embodiments, the configuration does not cause the rollers to run eccentrically on their shafts, rather the shaft center line spacing is altered. Reference marks on the bushing flanges can simplify the process of setting them to be in mirror positions, which may be a requirement to keeping the shafts parallel. Other embodiments may include adding a reinforcing strap around the fork arms such that changing its position along the arms it effectively alters the arm length and hence the stiffness.

In another embodiment, the deep rolling tool may include a screw adjustment to alter the roller spacing by forcing the arms apart or together which has a similar effect to the eccentric bushing concept. In certain embodiments, the benefit of eccentric bushings can provide a greater range of adjustment for a deep rolling tool, thus allow for a greater range of blade geometries. While it may not be possible to have a single tool suitable for all blade shapes, it will reduce the number of tools required.

While this disclosure has been particularly shown and described with references to exemplary embodiments thereof, it will be understood by those skilled in the art that various changes in form and details may be made therein without departing from the scope of the claimed embodiments.

What is claimed is:

1. A machine, comprising:
   a deep rolling tool comprising;
      a flexible first fork arm and a flexible second fork arm each extending outwardly from a base section;
      a first rolling element rotatably secured to a distal end of the flexible first fork arm;
      a second rolling element rotatably secured to a distal end of the flexible second fork arm, wherein the flexible first fork arm and the flexible second fork arm are configured to locate the first rolling element and the second rolling element in a facing spaced relationship with respect to each other and wherein the flexible first fork arm and the flexible second fork arm extend outwardly from the base section without a pivot such that movement of the distal end of the flexible first fork arm with respect to the distal end of the flexible second fork arm is dependent upon a flexural stiffness of the flexible first fork arm and a flexural stiffness of the flexible second fork arm; and
   a positioning element operatively coupled to the deep rolling tool, wherein the positioning element is configured to apply the first rolling element and the second rolling element to opposite sides of an article.

2. The machine of claim 1, wherein the first rolling element and the second rolling element are crowned rollers.

3. The machine of claim 1, wherein the machine is a 5-axis machine and the positioning element is configured to position the deep rolling tool in three dimensions, and rotate the tool in two dimensions.

4. The machine of claim 1, wherein a block of the deep rolling tool is mounted to the positioning element and the flexible first fork arm and the flexible second fork arm are perpendicularly arranged with respect to the positioning element and wherein the first rolling element rotates about a first axis and the second rolling element rotates about a second axis, the first axis being parallel to the second axis.

5. The machine of claim 1, wherein the deep rolling tool may be rotated along a central axis of the deep rolling tool by the positioning element.

6. The machine of claim 1, wherein the positioning element is configured to move the deep rolling tool in an alternating motion from a retracted position to an extended position with respect to the positioning element.

7. The machine of claim 1, wherein the positioning element is configured to move the deep rolling tool in a linear path.

8. The machine of claim 1, wherein the first rolling element and the second rolling element are crowned rollers each having a minor radius for contacting the articles, and a major diameter adapted to provide a load capacity.

9. The machine of claim 1, wherein the article is at least one of a turbine blade, a compressor blade, a fan blade, a bladed disk, a bladed element and a metal object.

10. The machine of claim 1, wherein the deep rolling tool is configured to apply a compressive stress to the opposite sides of the article.

11. A machine, comprising:
a deep rolling tool having a plurality of rolling elements rotatably secured thereto, wherein the plurality of rolling elements are configured to define an opening therebetween at the distal end of a pair of flexible fork arms of the deep rolling tool and wherein the pair of flexible fork arms are secured to the deep rolling tool without a pivot such that movement of the distal end of the pair of flexible fork arms with respect to each other is dependent upon a flexural stiffness of each of the pair of flexible fork arms, and wherein the plurality of rolling elements are configured to apply a compressive stress to an articles located in the opening; and
a positioning element coupled to the deep rolling tool, wherein the positioning element is configured to position and apply the plurality of rolling elements to surfaces of a bladed element by locating the bladed element in the opening.

12. The machine of claim 11, wherein the plurality of rolling elements apply a compressive stress to the bladed element without an actuator applying a force to either one of the pair of flexible fork arms in order to relocate the pair of flexible fork arms with respect to each other.

13. The machine of claim 11, wherein the machine is a 5-axis machine and the positioning element is configured to position the deep rolling tool in three dimensions, and rotate the tool in two dimensions.

14. The machine of claim 11, wherein a block of the deep rolling tool is mounted to the positioning element and the pair of flexible fork arms are perpendicularly arranged with respect to the positioning element and wherein a portion of the plurality of rolling elements are located on one side of the opening for rotation about a first axis and another portion of the plurality of rolling elements are located on another side of the opening opposite the one side of the opening for rotation about a second axis, the first axis being parallel to the second axis.

15. The machine of claim 11, wherein the deep rolling tool is rotated along a central axis of the deep rolling tool by the positioning element.

16. The machine of claim 11, wherein the positioning element is configured to move the deep rolling tool in an alternating motion from a retracted position to an extended position with respect to the positioning element.

17. The machine of claim 11, wherein the positioning element is configured to move the deep rolling tool in a linear path.

18. The machine of claim 11, wherein the plurality of rolling elements are crowned rollers each having a minor radius for contacting a surface of the bladed element when it is located in the opening and a major diameter providing a load capacity.

19. The machine of claim 11, wherein the bladed element is at least one of a turbine blade, a compressor blade, a fan blade, a bladed disk and a metal object.

20. The machine of claim 11, wherein the deep rolling tool is configured to apply a compressive stress to opposite sides of the bladed element when it is located in the opening.

* * * * *